(12) United States Patent
Gabrys

(10) Patent No.: US 6,508,145 B1
(45) Date of Patent: Jan. 21, 2003

(54) PRESS-FIT MULTI-RING COMPOSITE FLYWHEEL RIM

(75) Inventor: Christopher W. Gabrys, Federal Way, WA (US)

(73) Assignee: Toray Composites (America), Inc., Tacoma, WA (US)

( * ) Notice: Subject to any disclaimer, the term of this patent is extended or adjusted under 35 U.S.C. 154(b) by 43 days.

(21) Appl. No.: 09/687,352

(22) Filed: Oct. 12, 2000

Related U.S. Application Data
(60) Provisional application No. 60/159,042, filed on Oct. 12, 1999.

(51) Int. Cl.[7] .............................. G05G 3/00; H02K 1/22; B32B 31/16
(52) U.S. Cl. .......................... 74/572; 310/261; 156/74
(58) Field of Search .................... 74/572–574; 310/261; 156/74; 264/229

(56) References Cited

U.S. PATENT DOCUMENTS

| | | | |
|---|---|---|---|
| 3,692,456 A | * 9/1972 | Foster | 425/412 |
| 4,266,442 A | 5/1981 | Zorzi | |
| 4,370,899 A | 2/1983 | Swartout | |
| 4,996,016 A | * 2/1991 | Walls et al. | 264/229 |
| 5,057,071 A | * 10/1991 | Piramoon | 494/16 |
| 5,084,219 A | * 1/1992 | Sigur | 264/25 |
| 5,552,197 A | * 9/1996 | Bettinger | 428/34.9 |
| 5,713,246 A | * 2/1998 | Thoolen | 74/572 |
| 6,325,108 B1 | * 12/2001 | Bettinger | 138/153 |
| 2001/0054856 A1 | * 12/2001 | Gabrys | 310/261 |

FOREIGN PATENT DOCUMENTS

| | | | |
|---|---|---|---|
| JP | 2000-55134 | * 2/2000 | 74/572 |

OTHER PUBLICATIONS

Ryan et al., "Relaxation of Press-fit Interference Pressure in Composite Flywheel Assemblies," 43re International SAMPE Symposium, May 31–Jun. 4, 1998.*

"Design, Fabrication and Testing of Advanced Composite Energy Storage Flywheels" Gabrys, May 1996.

* cited by examiner

Primary Examiner—Vinh T. Luong
(74) Attorney, Agent, or Firm—J. Michael Neary

(57) ABSTRACT

A composite flywheel rotor includes a flywheel hub having tapered outer surface and an axis of rotation and a flywheel rim having an axis of rotation coinciding with the hub axis of rotation. The flywheel rim has multiple rings axially press-fit together to precompress the rings to form a composite flywheel rim. Each ring is made of approximately equal radial thickness and the entire non-dimensionalized radial thickness ratio of the assembled rim should be between approximately 0.38 to 0.48. The rim is optimally made up of four or five individual rings, each of which rings has tapered inner and outer diameters, preferably tapered at small angles to produce large radial forces when the rings are pressed onto each other and the hub by pressing axially, resulting in a high radial compressive preload in the assembled rim. A taper angle of 1–5° is suitable.

23 Claims, 2 Drawing Sheets

PRESS-FIT MULTI-RING COMPOSITE FLYWHEEL RIM

This application claims the benefit of Ser. No. 60/159,042, filed Oct. 12, 1999.

This invention is an improved design of a high-speed composite flywheel rim and more particularly a flywheel rotor incorporating a metallic hub and multiple press-fit composite carbon fiber rings forming the rim.

BACKGROUND OF THE INVENTION

Flywheel systems have been used for many years for storing energy in the systems, and then releasing that stored energy back into other systems. Flywheel systems provide a smoothing effect to the operation of internal combustion engines and other kinds of power equipment as well as in electrical applications such as uninterruptible power supplies, electric vehicles and battery replacement.

Various forms of high-speed energy storage flywheels using composite materials have been in use since the 1970's. Many designs for these high-speed energy storage flywheels have included filament wound composite rings made of either glass or carbon fibers in an epoxy matrix. Such filament wound rings have the inherent advantage of very high hoop direction strengths, which are needed to match the very high hoop stresses generated during rotation. One drawback to the use of filament wound composite rings for the rim portion of a high-speed flywheel is inherently low radial strength resulting from absence of fiber reinforcement in that direction. Because the radial direction stresses in a filament wound ring being rotated are controlled by the non-dimensionalized radial thickness of the ring (ratio of ID to OD), such rings must be made thin. Because a single ring must be made very thin so that it does not fail at a prematurely low rotational speed, the ring becomes less effective for energy storage. Another problem that arises is that the hub, which is used to attach the rim to the shaft, must be made larger due to the larger ID of the filament wound ring. This causes unacceptably high stresses in the hub which reduces the maximum speed possible and hence energy storage capability of the flywheel.

To avoid the problem of excessive radial stresses in the filament wound ring without requiring the ring to be made radially thin, multiple thin rings can be placed in a concentric arrangement, which will then function as one thick ring. One way to couple together several radially thin rings to make a thicker flywheel rim is by press-fitting. By assembling the rings together with a radial interference between each ring, the rings can be driven into radial compression at zero speed. When the rotor is spun to high speed, the radial compression between the rings is lessened. At failure speed, the pressure between two or more rings goes into tension and the rings separate.

Although press-fit rims have been employed in several flywheels designed to date, there is a need for an optimal design of a flywheel that employs press-fit composite rings. Such optimization generally applies to simultaneous consideration of rotor performance and the cost of manufacture. To date, experimental rims have been assembled from as many as ten rings and as few as two. A wide variety of fibers have been used in the composite rings and the ratio of ID to OD has been widely varied.

SUMMARY OF THE INVENTION

Accordingly, this invention provides a cost-performance optimized flywheel rotor assembly having a flywheel rim comprised of press-fit composite rings.

The composite flywheel rotor of this invention includes a flywheel hub having a tapered outer surface and a concentric flywheel rim. The flywheel rim has multiple rings axially press-fit together to precompress the rings to form a composite flywheel rim. Each ring is made of approximately equal radial thickness and the entire non-dimensionalized radial thickness ratio of the assembled rim should be between approximately 0.38 to 0.48. The rim is optimally made up of four or five individual rings, each of which rings has tapered inner and outer diameters, preferably tapered at small angles to produce large radial forces when the rings are pressed onto each other and the hub by pressing axially, resulting in a high radial compressive preload in the assembled rim. A taper angle of 1–5° is suitable. The assembly uses standard modulus (30–40 Msi) or intermediate modulus (40–50 Msi) carbon fiber for all of the rings.

DESCRIPTION OF THE DRAWINGS

This invention and its many attendant advantages will become more clear upon reading the following description of the preferred embodiments in conjunction with the following drawings, wherein.

DESCRIPTION OF THE PREFERRED EMBODIMENT

Figure 1:
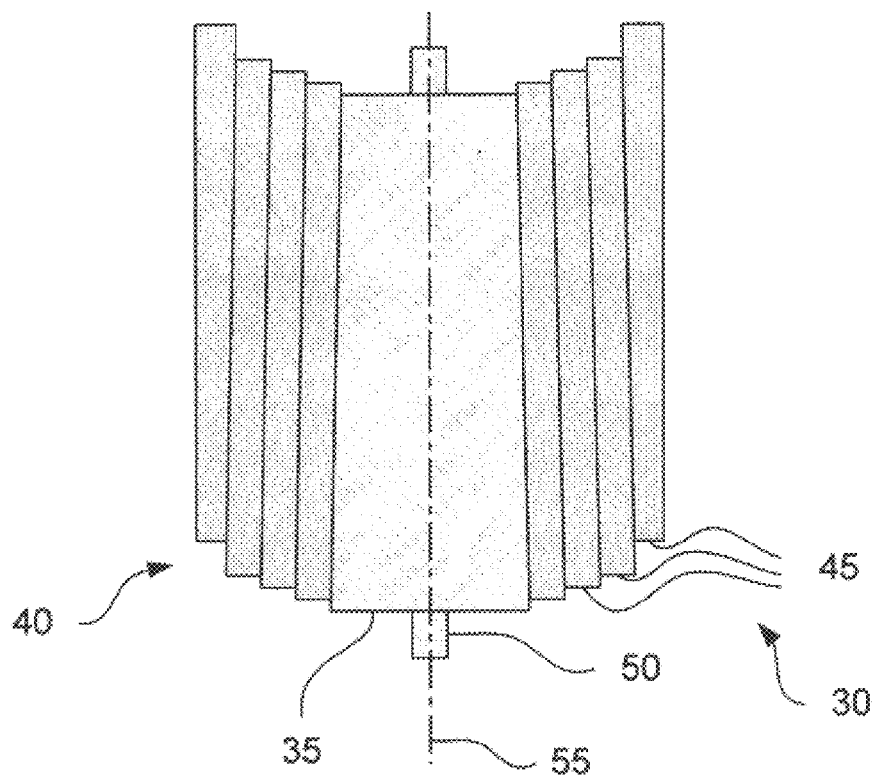
FIG. 1 is a schematic sectional elevation of a flywheel prior to assembly in accordance with this invention.
Figure 2:
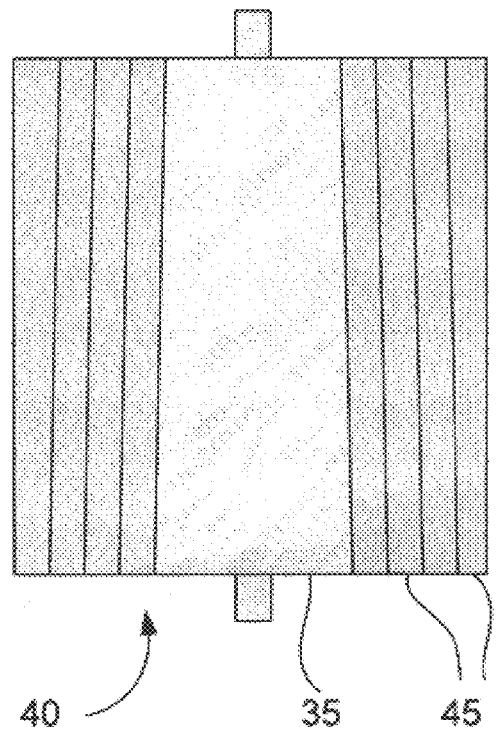
FIG. 2 is a schematic sectional elevation of a flywheel after to assembly in accordance with this invention.

Turning now to the drawings, wherein like reference characters designate identical or corresponding parts, and more particularly to FIGS. 1 and 2 thereof, a flywheel rotor 30 is shown having a hub 35 and a rim 40. The hub 35 has a pair of stub shafts 50 projecting axially along an axis of rotation 55 for journaling the hub for high-speed rotation within a vacuum chamber and ballistic container (not shown). Other structures for supporting the hub in the vacuum chamber for high speed rotation can also be used, as is well known in the flywheel industry. An electric motor/alternator is coupled to the hub for initially driving the flywheel up to speed, and then recovering the energy, stored in the flywheel as rotational inertia, by converting it back to electrical energy in the alternator. A separate motor and generator may also be used, as is known in the art.

The hub 35 is preferably a solid metal cylinder. Aluminum can be used but 4340 steel is preferred for improved fatigue life, safety factors and lower cost. The hub must be solid and without a center hole because otherwise the stresses in the hub become excessively high during rotation. For instance, even the addition of a pinhole in the axial center of the rotor causes the hoop direction hub stresses to double. The attachment of the hub to shaft is preferably done by making them integral, that is, out of the same piece of metal. Attaching the shaft by bonding or bolting it on to each end of the hub would result in lower performance and increased tolerances in the run-out and alignment between the rotor and shafts.

Figure 3:
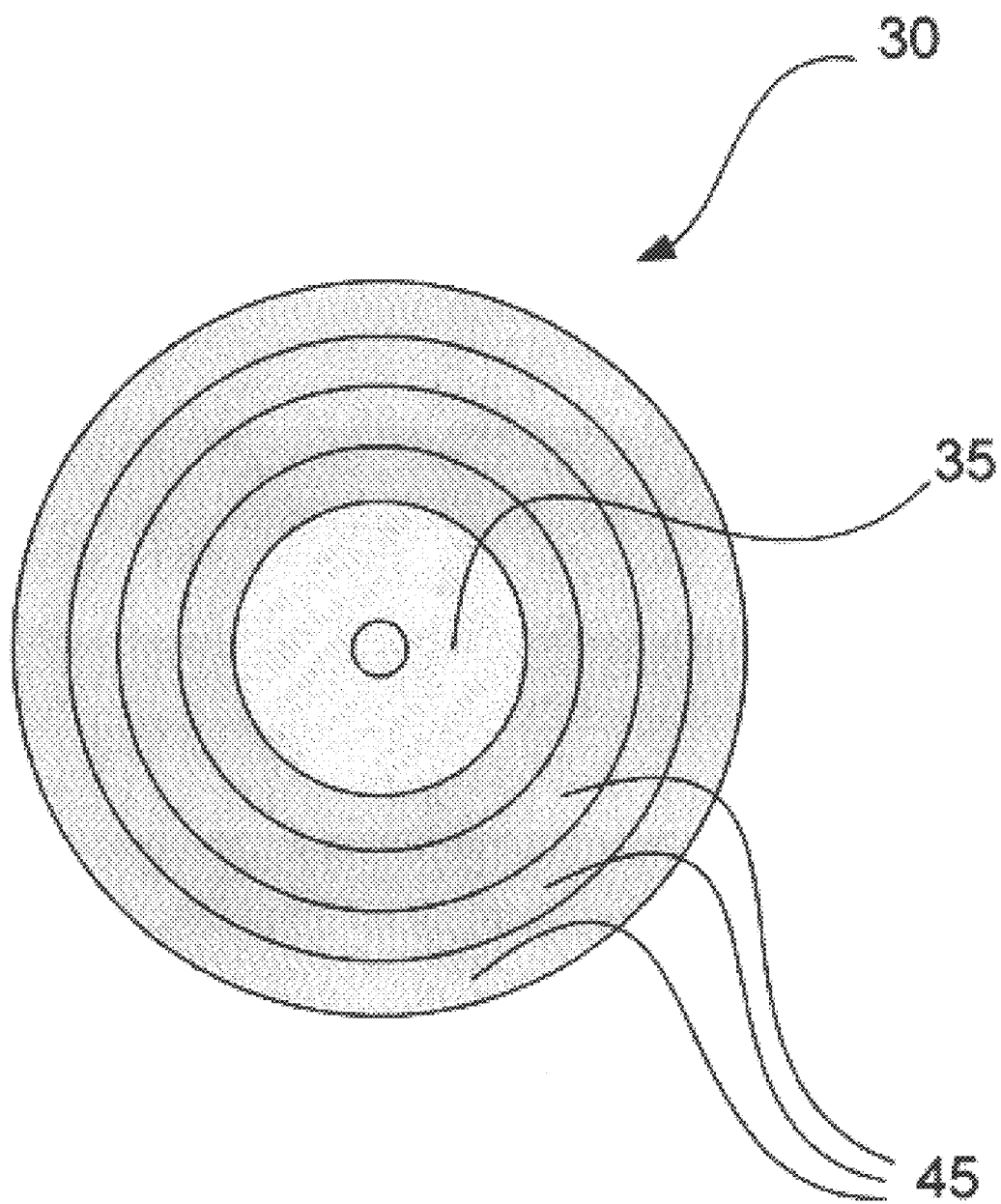
FIG. 3 is a plan view of a flywheel after assembly in accordance with this invention.

The rim 40 is comprised of several rings 45. Each of the rings has tapered inner and outer diameters, preferably tapered at small angles to produce large radial forces when the rings are pressed onto each other and the hub 36 by pressing axially. The outer surface of the outermost ring need not be tapered but may be straight sided, with equal OD for its entire axial length. A taper angle of 1–5° is suitable. Because the mean ID of the outer ring is smaller than the mean OD of the inner ring, the two rings slide together only partially when stacked axially. Axial force is then applied to the complete assembly to press fit the rings into the nested, axially flush position shown in FIG. 2. As shown in FIG. 3, several rings can be assembled together with this method which results in a high radial compressive preload in the assembled rim. The hub, which can be made acceptably small in diameter due to the larger radial thickness of the composite rim, can also have a tapered OD and be pressed inside the rim. This can be used to insure that the rim stays connected to the hub at high speed.

Preferably, the total rotor is assembled with all taper angles aligned in the same direction and such that the small diameters are at the top of the rotor when it spins about the vertical axis. This prevents the rotor from falling apart when spun to separation speed. With the small diameters on the bottom of the rotor, rings would simply fall off the rotor at maximum speed. It is preferable to choose taper angles such that the initial percentage of ring overlap is at least 50%. Angles too low, resulting in less initial overlap; can cause failure during assembly due to development of high shear stresses.

The present invention is cost-performance optimized for a press-fit composite flywheel rotor. The optimum rotor design uses standard modulus (30–40 Msi) or intermediate modulus (40–50 Msi) carbon fiber for all of the rings. Using intermediate modulus (40–50 Msi) carbon fiber to make up all of the filament wound rims optimizes the rotor for the maximum speed at which the rings separate while keeping a hoop factor of safety. However, intermediate modulus carbon fiber costs roughly 2–4 times as much as standard modulus carbon fiber. Using standard modulus carbon fiber optimizes the flywheel assembly for lowest cost per energy storage. Using glass fiber or other lower modulus fibers could cause the rings to separate from each other and the hub prematurely. Using high modulus (50–60 Msi) or ultra high modulus (>60 Msi) carbon fiber results in lower factor of safety in the hoop direction due to the lower inherent strength of higher modulus fibers and a significantly increased rotor cost. Each ring 45 should be made of approximately equal radial thickness and the entire non-dimensionalized radial thickness ratio of the assembled rim should be between approximately 0.38 to 0.48. A rim ID/OD ratio of less than 0.38 results in a composite rim in which the individual rings could separate at a prematurely low speed. If the rim ratio is greater than 0.48, the factor of safety on the hub becomes too low at maximum allowable rim speed. The rim 40 is optimally made up of four or five individual rings 45. If more than five rings are used, the rings tend to thin and can be cracked during the press-fit assembly process. Additionally, more rings increase the total cost to manufacture. If less than four rings are used, the radial stresses in any individual ring's radial center can become too high. The rings may also separate at a prematurely low speed. Using less than 4 rings also requires higher radial interference pressures to be present during the press fitting operation.

When four rings are used, the radially middle two rings are assembled first with a lower interference pressure. The radial pressure between the middle two rings increases during assembly when the inner and outer rings are pressed on. The interference pressure between rings at zero speed should be approximately 15,000–20,000 psi. Lower pressures result in lower ring separation speeds and much higher pressures can results in failing the composite rings during assembly. The rims 40 can include helical winding layers (not shown) to increase axial strength. However it is preferred to use only hoop wound rings due to lower cost potential and perceived adequate axial strength.

The press-fit assembly process is preferably done by using epoxy as a lubricant between sliding surfaces to reduce friction and hence assembly forces. The epoxy also helps to bond the rings together after assembled. The rings 45 are held in the assembled position shown in FIG. 2 after they are press-fit together while the epoxy lubricant/bonding agent sets to prevent the axial forces resolved by radial squeezing on tapering surfaces from forcing the rings axially apart from each other and the hub 35.

Obviously, numerous modifications and variations of the preferred embodiment described above are possible and will become apparent to those skilled in the art in light of this specification. For example, the rings 45 could be made of other known materials which exist presently and will be developed in the future and these other materials may be used while remaining within the scope of this invention, which is not intended to be limited to any particular materials other than in those claims in which they are specifically claimed. Many functions and advantages are described for the preferred embodiment but in some uses of the invention, not all of these functions and advantages would be needed. Therefore, I contemplate the use of the invention using fewer than the complete set of noted features, benefits, functions and advantages. Moreover, several species and embodiments of the invention are disclosed herein or would be obvious in view of this disclosure, but not all are specifically claimed, although it is intended that all of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, Wherein I claim:

1. A flywheel rotor, comprising
 a flywheel hub having an axis of rotation and a tapered outer surface;
 a flywheel rim having an axis of rotation coinciding with said hub axis of rotation, and having an inner surface facing radially inward and having an outer surface facing radially outward;
 said rings have faying surfaces, in contact with a surface of said hub or another ring, that are tapered, and all taper angles are aligned in the same direction, with small inside diameters of said rings and said hub at the top of the rotor when it spins about a vertical axis;
 said flywheel rim consisting of at least two rings axially press-fit together to precompress said rings radially to form a composite flywheel rim.

2. A flywheel rotor as defined in claim 1, wherein;
 said flywheel rim has at least three rings axially press-fit together with an interfacial pressure of 15,000–20,000 PSI to prestress said rings radially to form a composite flywheel rim.

3. A flywheel rotor as defined in claim 2, wherein:
 each of said rings is tapered approximately equal radial thickness.

4. A flywheel rotor as defined in claim 3, wherein;
 said rim is made up of about four to five individual rings.

5. A flywheel rotor as defined in claim 3, wherein;
said rings are made of standard modulus (30–40 Msi) carbon fiber in an epoxy matrix.

6. A flywheel rotor as defined in claim 3, wherein;
said rings are bonded together with an epoxy resin applied as an interlaminar lubricant/bonding agent during assembly of said rings into a press-fit ring.

7. A flywheel rotor as defined in claim 3, wherein;
each of said rings is tapered approximately 1–5°.

8. A flywheel rotor as defined in claim 2 wherein;
said flywheel rim has a non-dimensionalized assembled thickness ratio of approximately between 0.38 to 0.48.

9. A flywheel rotor as defined in claim 2, wherein;
said rim is made up of about four to five individual rings.

10. A flywheel rotor as defined in claim 2, wherein;
said rings are made of standard modulus (30–40 Msi) carbon fiber in an epoxy matrix.

11. A flywheel rotor as defined in claim 2, wherein;
said rings are bonded together with an epoxy resin applied as an interlaminar lubricant/bonding agent during assembly of said rings into a press-fit ring.

12. A flywheel rotor as defined in claim 2, wherein;
each of said rings is tapered approximately 1–5°.

13. A flywheel rotor as defined in claim 1, wherein;
said rim is made up of about four to five individual rings.

14. A flywheel rotor as defined in claim 13, wherein;
said rings are bonded together with an epoxy resin applied as an interlaminar lubricant/bonding agent during assembly of said rings into a press-fit ring.

15. A flywheel rotor as defined in claim 1, wherein;
each of said rings is approximately equal radial thickness.

16. A flywheel rotor as defined in claim 15, wherein;
said rings are made of standard modulus (30–40 Msi) carbon fiber in an epoxy matrix.

17. A flywheel rotor as defined in claim 1, wherein;
said rings are bonded together with an epoxy resin applied as an interlaminar lubricant/bonding agent during assembly of said rings into a press-fit ring.

18. A flywheel rotor as defined in claim 17, wherein;
each of said rings is tapered approximately 1–5°.

19. A flywheel rotor as defined in claim 1, wherein;
said rings are made of standard modulus (30–40 Msi) carbon fiber in an epoxy matrix.

20. A flywheel rotor as defined in claim 19, wherein;
said rings are bonded together with an epoxy resin applied as an interlaminar lubricant/bonding agent during assembly of said rings into a press-fit ring.

21. A flywheel rotor as defined in claim 1, wherein;
each of said rings is tapered approximately 1–5°.

22. A flywheel rotor comprising
a flywheel hub having an axis of rotation;
a flywheel rim having an axis of rotation coinciding with said hub axis of rotation, and having an inner surface facing radially inward and having an outer surface facing radially outward;
said flywheel rim consisting of at least two rings axially press-fit together to precompress said rings radially to form a composite flywheel rim;
said flywheel rim has a non-dimensionalized assembled thickness ratio of between 0.38 to 0.48.

23. A flywheel rotor as defined in claim 22, wherein;
said rim is made up of about four to five individual rings.

* * * * *